United States Patent [19]

Heidel et al.

[11] Patent Number: 4,547,972
[45] Date of Patent: Oct. 22, 1985

[54] TILT SENSOR AND MONITORING SYSTEM

[75] Inventors: Jeffrey C. Heidel, Phoenix; Thomas R. Hoogervorst, Scottsdale; Lynn R. Lane, Phoenix; Harold L. Swartz, Glendale, all of Ariz.

[73] Assignee: Sperry Corporation, New York, N.Y.

[21] Appl. No.: 527,907

[22] Filed: Aug. 30, 1983

[51] Int. Cl.[4] ............................................... C01C 9/06
[52] U.S. Cl. .......................................... 33/366; 33/299
[58] Field of Search ................................... 33/366, 299

[56] References Cited

U.S. PATENT DOCUMENTS 3,739,364  6/1973  Talkington et al. ................... 33/366
4,085,375  4/1978  Galuschak ............................ 33/366

Primary Examiner—Robert I. Smith
Attorney, Agent, or Firm—Howard P. Terry; Arnold L. Albin

[57] ABSTRACT

An angular measuring system consisting of one or more sensors that transmit angular measurements to a central control unit where numerical readout of any selected sensor is provided. A threshold can be preset at individual sensors or the control unit for an allowable angular deviation, beyond which a warning device is actuated. The circuitry permits locating the sensors remotely from the console and provides precision and stability of operation. Low power consumption permits extended operating periods with internal batteries. False alarms are minimized by incorporating a hysteresis loop in the threshold detection circuitry.

17 Claims, 5 Drawing Figures

TILT SENSOR AND MONITORING SYSTEM

BACKGROUND OF THE INVENTION

1. Field of the Invention

The invention relates to apparatus for measuring angular displacement, and more particularly to a tilt sensor and controls for remotely displaying angular displacement of a multiplicity of such sensors with minimal power consumption.

2. Description of the Prior Art

There has long been a need for a compact and reliable system for sensing and measuring changes in angular displacement or for establishing and monitoring a reference level, as in construction of high rise buildings, road or bridge stress monitoring and liquid storage tank monitoring in relation to ground movement. It is further desirable, particularly in any system which is intended for use in remote areas with unattended operation, to have very low power consumption. Moreover, the device should have high precision and stability to permit accurate measurements over long periods of time without adjustment. It is desirable that the sensing device provide for a remote monitoring location so that the sensor can most advantageously be located, which location may be in conflict with ready observation. It is further desirable that such apparatus provide for initiating an alarm signal when the measured displacement exceeds some predetermined angle, so as to call attention to the need for adjustment or corrective measures.

One prior art device is the electronic inclination gauge described in U.S. Pat. No. 4,167,818, issued Sept. 18, 1979 and assigned to Robert Cantarella. This device provided a gravity sensing potentiometer operating in a balanced bridge circuit with numerical readout means integrally incorporated. However, use of a direct current exciting circuit leads to errors due to drift and D.C. offset and no provision was made for remote displays of the angular displacement. Another sensor apparatus was described by A. A. Hakhverdin in U.S. Pat. No. 4,377,912, issued Mar. 29, 1983. In that invention, an elongated sealed chamber, partly filled with a liquid dielectric, responded to changes in inclination by producing a corresponding change in the capacitance of electrodes placed therein. When used in association with a tuned-collector tuned-base oscillator, it provided a device sensitive to very small changes in inclination. However, such an LC oscillator is inherently unstable, and unsuitable for precise measurements over long periods of time without frequent recalibration. Moreover, this invention provided neither for remote readout nor a threshold alarm.

A system known as the ELECTROLEVEL, supplied by Tilt Measurement Limited, Hertfordshire, England, used a bubble level electrolytic sensor in combination with electronic signal conditioning units to provide an output voltage proportional to the degree of tilt of the sensing head. However, this system has a linear range limited to ±5 degrees and consumes relatively high power, so that battery life is short.

In U.S. Pat. No. 4,378,693, filed Feb. 11, 1981 and issued Apr. 5, 1983 to E. C. Ratcliffe, a deflection measuring system is described which develops positive and negative D.C. voltages which are compared to derive a difference D.C. voltage, the magnitude and sign of which are dependent on the angle and direction, respectively, of tilt. However, this system is excited from the A.C. main supply or an auxiliary oscillator, without provision for stabilizing the excitation signal amplitude. Further, the system relies on a D.C. coupled amplifier for nulling the sensor, which leads to errors due to drift and D.C. offset. If the system is provided with high gain to realize sensitivity to small angular deviations, the inherent circuit instability is magnified, as well as sensitivity to undesired transients and tripping of the auxiliary output at the alarm threshold.

The present invention provides a sensitive and precise level sensor capable of ready calibration and stable for long period of times without recalibration, operated in conjunction with a remote console and power source. Provision is made for numerical readout of a multiplicity of sensors and for providing an alarm when a preset threshold at any of the sensors has been exceeded. By the use of AC coupling employing a CMOS oscillator and low power operational amplifiers with high impedance resistor scaling, power consumption is reduced by an order of magnitude over other reported devices for this application. Linear operation over ±45 degrees is obtained.

SUMMARY OF THE INVENTION

The invention comprises a sensor assembly which may be coupled to an inanimate body to be monitored and which will respond to angular displacement by providing a first signal output proportional to the angle of the tilt and a second signal output when the displacement exceeds an angular deviation from a reference axis which may be variably adjusted; a remote display coupled to the sensor assembly with circuitry for providing a numerical readout of the deviation at any instant of time; a signalling device which provides an alarm when a threshold angular displacement has been exceeded; and a control device coupled intermediate the display and the signalling device which permits coupling to a multiplicity of such sensor assemblies and selecting any one of the sensors for readout while allowing the signalling device to be actuated by any sensor whose deviation exceeds the predetermined angular deviation.

A threshold detector incorporates a feedback loop to provide hysteresis, thereby minimizing false alarms for signals near the threshold level.

Preferably, the system also incorporates the features of internal calibration, and provision for driving external recorders. A battery supply may optionally be incorporated within the control unit.

DESCRIPTION OF THE PREFERRED EMBODIMENT

Figure 1:
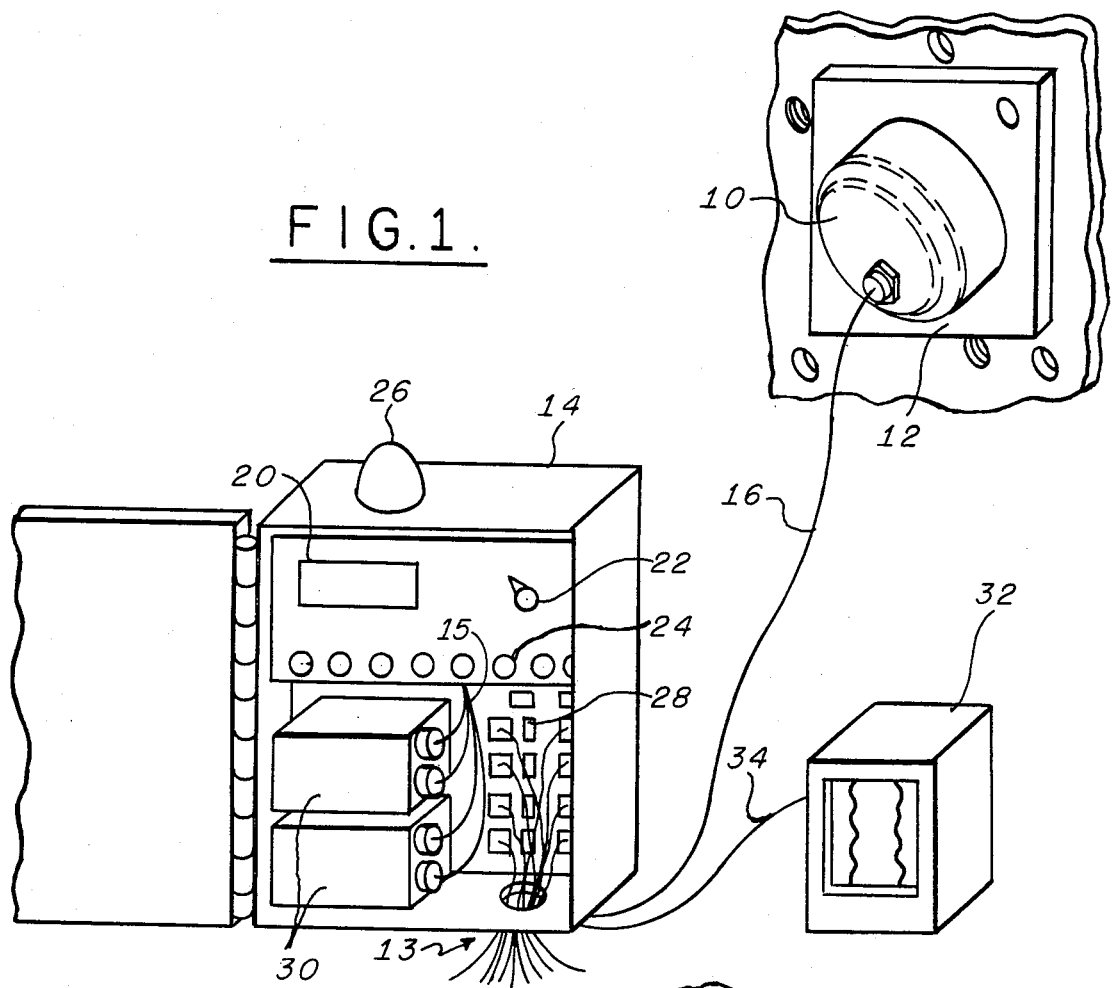
FIG. 1 is a view in perspective showing a tilt sensor and control system as used in the present invention.

Referring to FIG. 1, a perspective view of one embodiment of the tilt sensor and control system is shown. A sensor assembly 10 is mounted on a baseplate 12 which in turn is affixed to a structure, not shown, whose angular displacement is to be monitored. Prior to use of the system, the sensor assembly 10 must be calibrated as will be described below and aligned with respect to a vertical or horizontal reference axis. An apparatus for obtaining such alignment is described in copending application Ser. No. 527,908 filed Aug. 30, 1985, TILT SENSOR NULL ADJUSTING APPARATUS, inventors T. W. Neis and Harold L. Swartz, and assigned to the assignee of the present invention.

Associated with sensor assembly 10 is a control console 14 which may be coupled to the sensor by any suitable means, such as, for example, a cable 16. In addition to sensor assembly 10, a multiplicity of like sensors may also be connected to console 14 for simultaneous monitoring of a plurality of locations. These sensors may be similarly coupled by cables 18. The conceptual illustration of FIG. 1 contemplates a total of eight remote sensors, although a greater or lesser number may be utilized as desired with suitable adaptation of the control console. Also shown in control console 14 is numerical readout 20 which provides a digital display of the angular displacement of a selected sensor, which is selected by switch 22. A plurality of indicator lights 24 provides a light associated with each of the sensors, the light being triggered upon a sensor displacement exceeding a predetermined value. Thus, even though the numerical readout may be set at a particular one of the sensors, an indication will be provided should a nonselected sensor exceed the desired displacement value. Also provided is an alarm indicator 26, here shown mounted atop control console 14 to provide a visible indicator such as a strobe light or an audible alarm. Terminal strips or connectors 28 provide for coupling of the cables 16 and 18 to the console 14. Batteries 30, or an AC supply if a source of power is available, are used to provide energy to the console circuitry and to the sensor. If it is desired to provide a permanent record of the structural displacement as a function of time, a conventional recorder 32 coupled by cable 34 to console 10 will provide a suitable record in analog form. A multiplicity of such recorders may be used if it is desired to monitor multiple channels.

Figure 2:
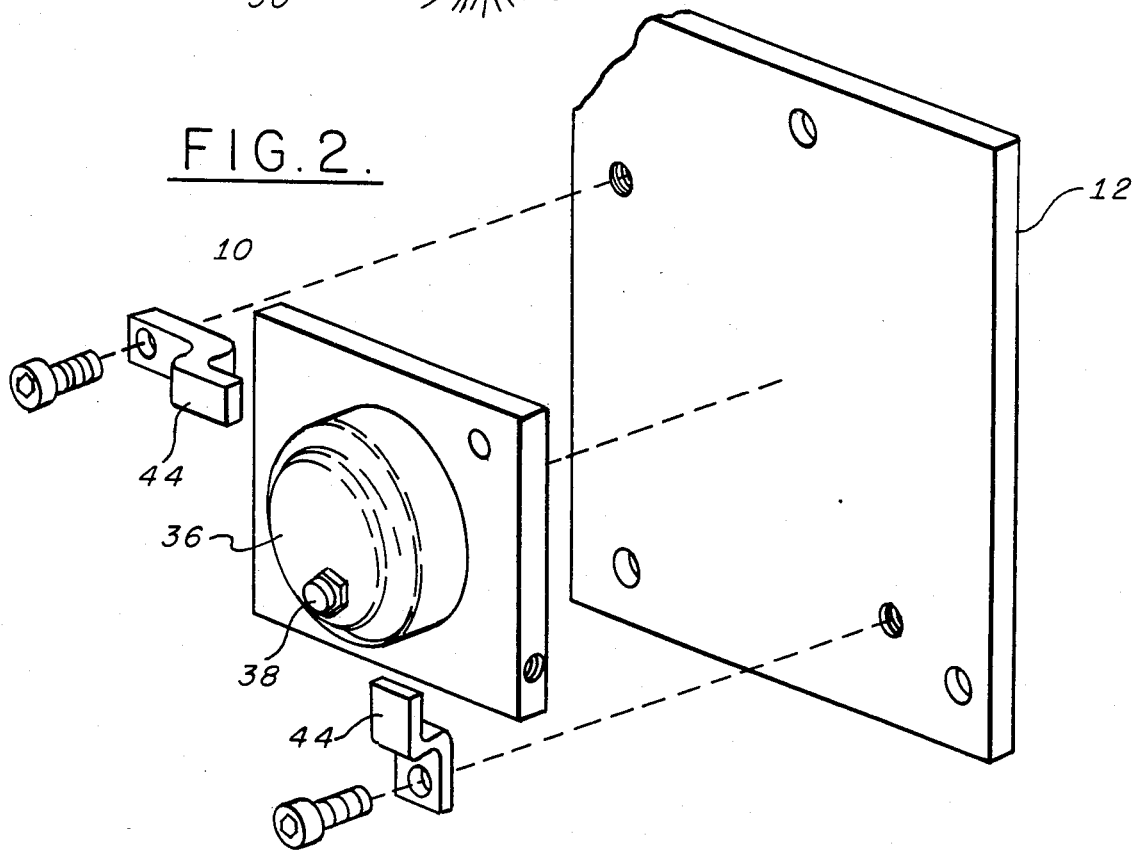
FIG. 2 is a view in perspective showing a tilt sensor for use in the present invention.

FIG. 2 shows a schematic view of a tilt sensor assembly for use in the invention. The sensor 10 may be comprised of a housing 36, which includes therein a sensing level responsive to gravitational forces and associated control circuitry for providing a readout signal through connector 38. The housing 36 is affixed to a mounting plate 40 which provides for alignment along a vertical axis. Mounting plate 40 contains drilled holes 42 for securing to baseplate 12, which is vertically oriented and affixed to the structure under surveillance, not shown. Clamps 44 may be used to secure the mounting plate 40 to baseplate 12. A suitable means for aligning the sensor element with the baseplate 12 and the supporting structure is provided in said Ser. No. 527,908, filed Aug. 30, 1985, however, other means which provide for precise and rigid alignment and mounting are also acceptable.

Figure 3:
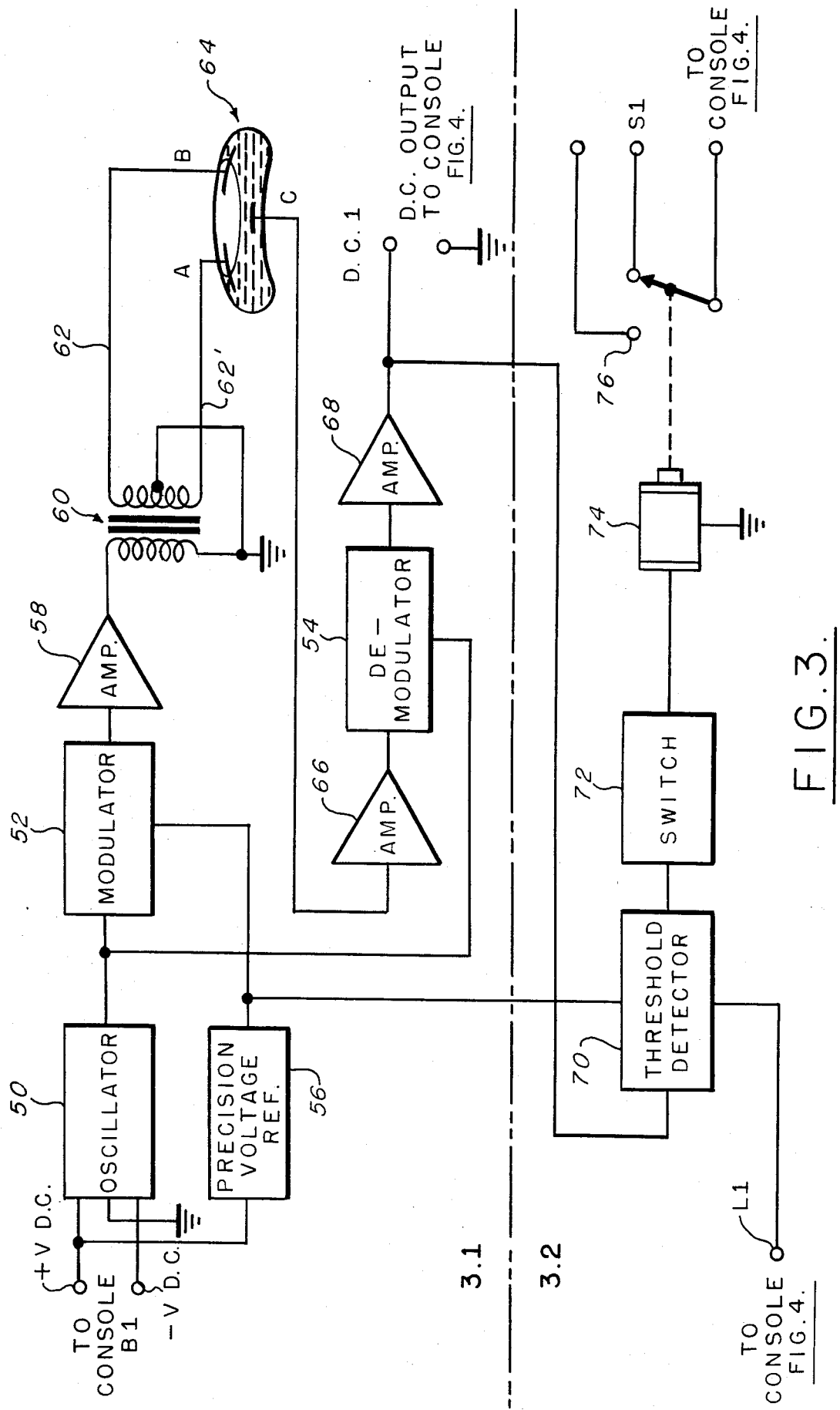
FIG. 3 is a schematic diagram showing a sensor excitation circuit (3.1) and detection circuit (3.2) for the preferred embodiment.

FIG. 3 shows a block diagram of circuitry for a preferred embodiment of the invention. A power supply, not shown, which may be comprised of a battery internal to the sensor housing, or from power provided by the control console on the interconnecting cable, provides voltages +VDC and −VDC to the system. Preferably, the power supply provides balanced outputs of equal and opposing polarities with respect to ground. CMOS oscillator 50 is energized by the power source and provides a square wave of approximately 400 hertz as a control signal for modulator 52. Oscillator 50 also provides a synchronizing signal to demodulator 54. Voltage reference 56, also energized by the power source, provides a highly stabilized output voltage for energizing the system electronics. The primary voltage supply and the regulated voltage outputs may also be furnished to other elements shown in the block diagram in the conventional manner.

The output of modulator 52 is applied to amplifier 58 to drive transformer 60. Transformer 60 has a balanced output 62 and 62' to energize sensor level 64. Preferably, the transformer will employ a bifilar secondary winding to assure symmetry. Other methods of providing a balanced output, such as by an A.C. coupled phase-inverting amplifier, may be used in lieu of transformer 60.

Sensor 64 is preferably an arcuate liquid level electrolytic sensor, of the type described in Ser. No. 486,631, filed Apr. 20, 1983, PRECISION INCLINOMETER WITH DIGITAL NUMERICAL READOUT, invented by Harold L. Swartz, et al, and assigned to the assignee of the present invention. Suitable sensors can provide a linear range up to ±45 degrees, and an unambiguous range up to ±90 degrees. The output of sensor 64 drives amplifier 66 which provides a 400 Hz square wave of variable amplitude and phase, proportional to the angle and direction of inclination of sensor element 64. Other sensor elements such as described in said Ser. No. 486,631, which is incorporated herein by reference, are also suitable for use in place of the arcuate electrolytic sensor shown.

Demodulator 54 is driven by amplifier 66 and triggered by oscillator 50 to provide a bidirectional D.C. output signal proportional in amplitude and polarity to the input A.C. signal. The D.C. output is buffered and boosted in amplifier 68 whose output is directed to the D.C. output terminal D.C. 1.

The sensor circuitry also includes a threshold detector 70 whose function is to compare the D.C. output to a predetermined value of control voltage which is established remotely at console 14. The output of detector 70 is used to energize switch 72 when the established threshold level has been exceeded thereby actuating a relay 74 and contacts 76. Contacts 76 are also coupled to the remote console to provide an energizing signal for the alarm indicator when the threshold is exceeded. Since transients and noise pickup on the control console lines used to establish the threshold settings remotely may otherwise cause erratic triggering of the alarm when the sensor signal approaches the threshold level, a novel hysteresis loop is incorporated in the threshold circuitry to establish a timedelay "dead zone" thereby avoiding response to the undesired short-duration pickup.

While the sensing apparatus shown herein provides an individual D.C. output to the remote console for each sensor for actuating the numerical indicators as will be described below, other transmission methods are also feasible, which may incorporate broadband transmission or multiplexing over a single cable. For example, an optical coupler housed in sensor assembly 10 may be used to convert the D.C. output to light energy, and similarly for the threshold detector and alarm switch connections. These outputs may be transmitted over a fiber-optic cable to the remote console, whereupon they can be reconverted to suitable control signals. Similarly, the D.C. output can be used to modulate a radio frequency transmitter operating at a suitable frequency, with a correspondingly tuned receiver located in the console, coupling receiver and transmitter by radiation or by coaxial cable. Other transmission coupling methods will be apparent to one skilled in the art. Similarly, the control console, which has heretofore been described as a remote apparatus, may be integrally joined with the sensing apparatus in a unitary device where the remote capability is not required. Further, it may be desired to provide capability for adjusting the detector threshold within the sensor housing, rather than remotely. Thus, the configuration described above is to be construed as exemplary, rather than limiting.

Figure 4:
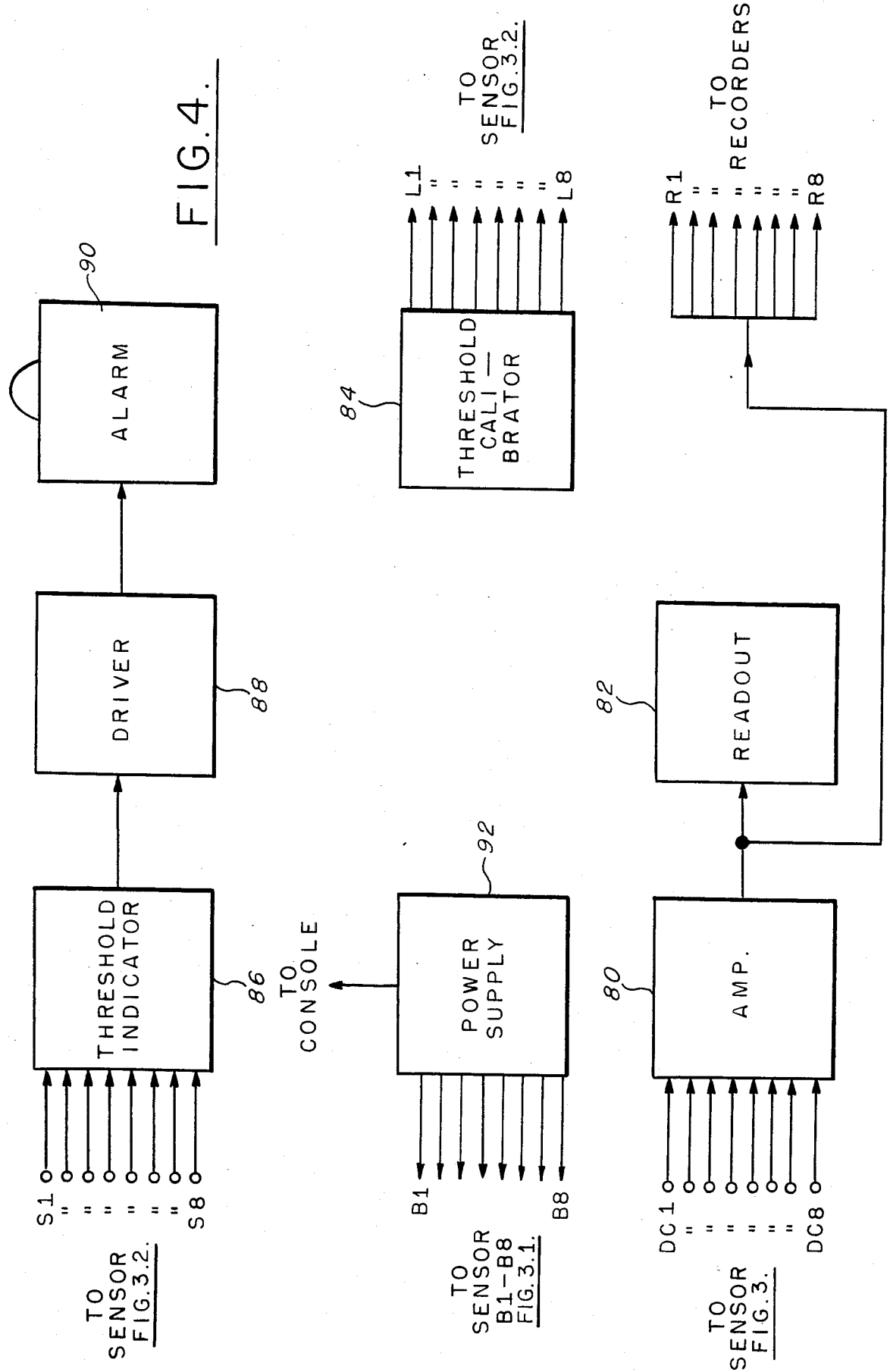
FIG. 4 is a schematic diagram showing circuitry for the control console.

A block diagram of a circuit configuration for a control console suitable for use in association with the sensor is shown in FIG. 4. An amplifier 80 is coupled to a desired sensor output and thence through a selector switch to readout device 82 which may incorporate analog-to-digital circuitry for digitizing the analog DC output from amplifier 80 and providing a numerical readout. Suitable displays are of the liquid crystal (LCD) and light-emitting diode (LED) types. The output of amplifier 80 may also optionally be coupled to external recorders such as R1–R8. Typically, two four-channel recorders would be sufficient for accepting eight sensor channels.

Provision is also made in threshold calibrator 84 to provide a plurality of analog control signals to the threshold detector 70, which may be a level comparator. The control signals are used to establish the predetermined displacement angle and hence a corresponding reference voltage for actuating the alarm. Suitable control signals may be provided by a series of voltage dividers, coupled to a regulated power supply or battery, and calibrated to provide a predetermined amplitude proportional to the allowable angular displacement.

A plurality of indicators 86 is also provided, coupled to signal lines S1–S8. These indicators may comprise conventional pilot lamps, actuated by transistor switches and powered by the console. While direct actuation of such pilot lights is also possible, the voltage drop over the interconnecting cables on long signal paths mitigates against such direct switching control. Of course, other digital indicators, such as the LCD and LED devices discussed above, may also be employed with suitable interface circuitry, and minimize power consumption.

Indicator 86 is used to enable driver 88 which may be a relay type device or a transistor switch. Driver 88 in turn actuates alarm 90 for furnishing an audible or visible indication when the preset angular displacement limits have been exceeded. The console may include circuitry in the threshold indicator 86 so that anyone of the input sensors may furnish an actuating signal to alarm 90 without the necessity for manual switching control. The system is powered by power supply 92 which may be a primary battery, rechargeable battery, or an A.C. supply if local alternating current power is available. In remote locations, solar cells may be useful to charge a rechargeable battery supply. The output of the supply is directed both to the console circuit elements and to the remote sensor over the interconnecting cables. Of course, if a fiber optic or radio frequency link is used, then local power must be provided at the sensor as well. Under normal monitoring conditions, the average power drain is approximately 3 ma with direct cable coupling.

The operation of the system will now be described with continued reference to FIGS. 3 and 4.

Oscillator 50 provides a square wave at approximately 400 Hz to drive modulator 52. Voltage reference 56 provides a regulated voltage derived from the external power supply +VDC and −VDC, which is chopped by modulator 52 accordingly. It is desired to use an A.C. signal rather than a DC signal since direct current amplifiers may encounter problems of drift and DC offset. The A.C. system also permits complete electrical isolation between input and output terminals, and facilitates improved common-mode-rejection to provide the low noise characteristics essential to the sensing of lower level signals. The output of modulator 52 drives amplifier 58 to provide an essentially constant peak amplitude pulse waveform to transformer 60. The center-tapped transformer provides outputs 62 and 62' for connection to corresponding electrodes B and A of bubble level 64. This provides energization of the level contacts in opposing phases relative to ground. Thus, when the sensor is tilted with respect to the reference plane, a differential signal is developed across contact C to ground, whose amplitude and phase are determined by the magnitude and direction of the tilt angle. The resultant pulsed signal is applied to amplifier 66 and thence to demodulator 54. Demodulator 54 is synchronized by oscillator 50 with the drive to modulator 52 to provide a rectified DC pluse output which may then be filtered. The resultant bidirectional analog signal, proportional to the tilt of bubble level 64, is applied to amplifier 68. The variable direct current output signal D.C. 1 is then transmitted to amplifier 80 in the the control console 14 for utilization by the readout circuitry.

Also associated with the output D.C. 1 is threshold detector 70. A calibration reference voltage derived from calibration resistors in the console and the regulated supply in the sensor establishes a predetermined alarm threshold. It should be noted that amplifier 66 has a calibrated gain to assure compatible scale factors between the output D.C. 1–D.C. 8 of the respective sensors and the calibration voltages on lines L1–L8. The output of the threshold detector 70 is coupled to switch 72 for driving relay 74 which controls contacts 76 connected to energize an alarm 90 in the console. The outputs from the contacts 76 are coupled to the threshold indicator 86 so that, when the present threshold value of any sensor is exceeded, which is determined by the threshold calibration setting in the console, the associated indicator will denote which sensor has been tripped. This signal in turn is fed to the driver 88 to energize alarm 90.

Figure 5:
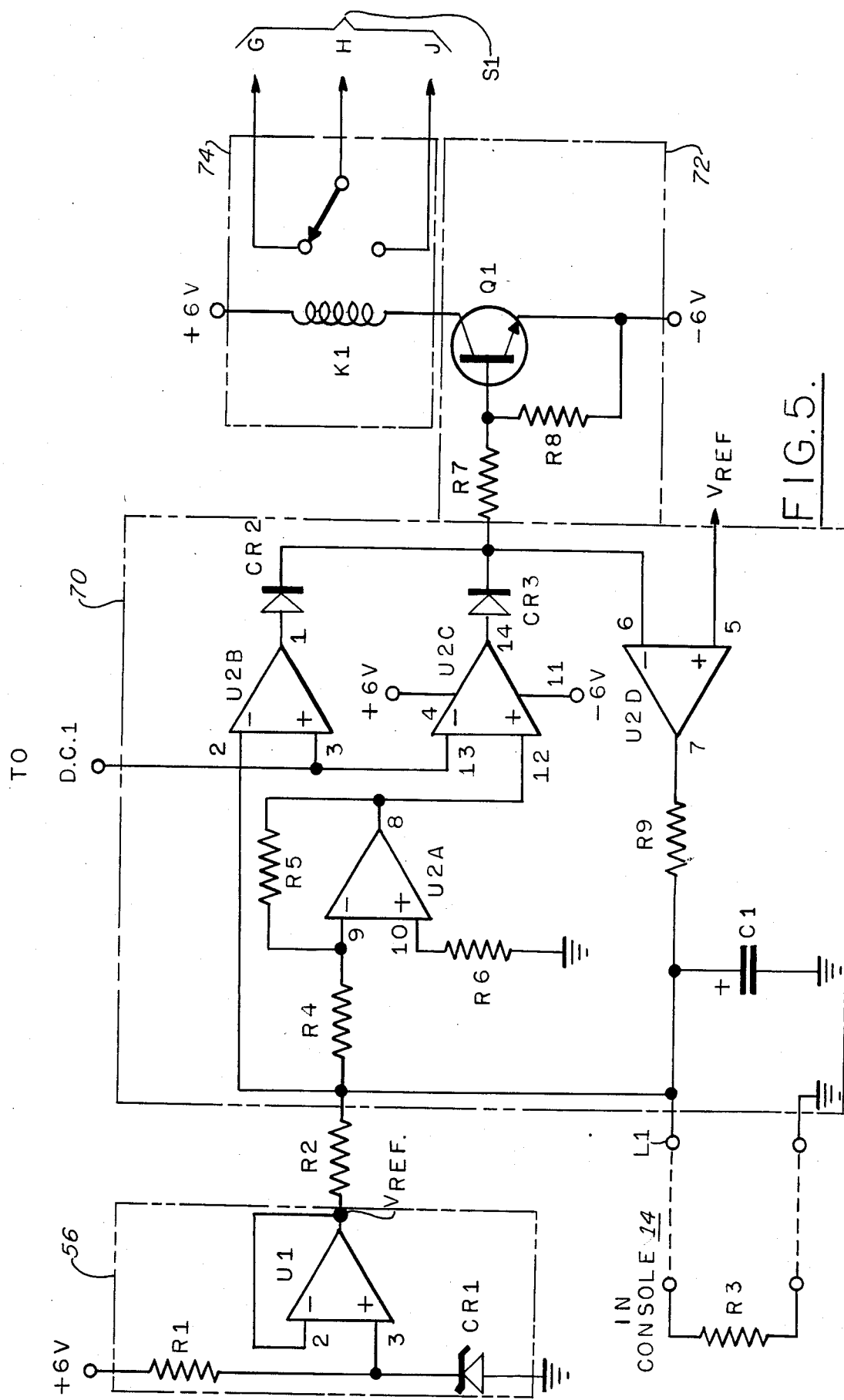
FIG. 5 is a circuit diagram of a threshold detector, showing a hysteresis feedback loop.

The elements of FIG. 3.2 are shown in circuit schematic form in FIG. 5, shows a preferred embodiment of a threshold detector, whose operation is as follows. A precision voltage reference diode CR1 is used to establish a reference potential $V_{REF}$. U1 is connected as a voltage follower to buffer the reference source. The output from terminal 1 of U1 is fed to divider network R2–R3, which is proportioned to provide a suitable control potential at the node of R2 and R4, say 1.25 VDC. Resistor R3 is preferably housed in the remote console but may also be located within the sensor housing; by changing the resistance value, the threshold response level is correspondly adjusted.

U2A is an operational amplifier wired as an inverter. Resistors R4 and R5 are selected to provide a gain of unity. Resistor R6 is used to bias the amplifier and is preferably chosen to be one-half the value of R5.

U2B and U2C are complementary threshold detectors. Each comprises a high gain differential amplifier, operated openloop. The reference voltage at pin 2 of U2B is the predetermined threshold value derived from the $V_{REF}$ source and the R2-R4 divider. The reference voltage at pin 12 of U2C is of equal value and opposite polarity as a result of inversion by U2A. This combination provides the capability of sensing both positive and negative variable D.C. outputs for comparison with the corresponding control potential levels.

Thus, when the D.C. variable level at pin 3 of U2B slightly exceeds the reference level, U2B will be driven into saturation, biasing the diode CR2 high and thereby causing Q1 to conduct, actuating relay K1 and contacts H and J to the alarm. Since U2C will be driven negative, CR3 diode provides isolation from the DC level at the base of Q1. R7 and R8 are chosen to bias Q1 for operation in saturation. Q1 is shown as an NPN switching transistor, although other types, such as PNP, may be used with appropriate bias and power supply modifications.

When the sensor is tilted from its null position so as to provide a negative D.C. level at pin 13 of U2C and pin 3 of U2B exceeding the threshold control level, U2B will be driven negative, and U2C will be driven to positive saturation, actuating K1 as heretofore described. CR2 provides isolation from the base of Q1. Thus, it may be seen that the circuit responds to positive or negative values of the D.C. variable output voltage when the preset reference threshold is exceeded.

It is desirable to add hysteresis to the response of Q1, thereby preventing oscillation of the Q1 switch at the threshold response point. In the prior art, it has been customary to provide positive feedback to the comparator, such as by providing a resistor $R_A$ between pins 1 and 3 of U2B or resistor $R_B$ between pins 12 and 14 of U2C. However, this approach has the disadvantage of requiring two discrete comparators which must be matched, and hence lose flexibility in changing the value of hysteresis for particular operational conditions, such as to suit the damping characteristics of the sensor. The circuit of FIG. 5 provides hysteresis with a single resistor R9, operating in conjunction with open-loop differential amplifier U2D. When the value of the DC voltage at pin 6 of U2D is less than $V_{REF}$ (Q1 non-conducting) U2D will be driven into positive saturation, boosting the voltage applied at node R2-R4 by an incremental value determined by the R3-R9 voltage divider. When U2B or U2C is driven to conduction by the variable D.C. voltage (Q1 conducting) pin 6 of U2D will swing positive to a value exceeding $V_{REF}$, and the amplifier will provide a negative output voltage, thus incrementally decreasing the reference level at R2-R4. It may be seen then that the effect of the hysteresis loop is to require a threshold input voltage to change over a wider range before actuating or causing the alarm to drop out. The network R3-R9 permits adjusting the deadzone region to a desired value. In one embodiment, a differential of 200 mV was found satisfactory, with a ratio of R9/R3 of 50:1. By providing the hysteresis loop with a voltage reference derived from the same source as the control voltage, the loop automatically tracks and compensates for any drift in the precision reference source.

The analog voltages representing angular displacement are fed to individual amplifiers in block 80 where a desired output may be selected by a rotary switch 22 for display on the internal readout 82. Individual recorder channels R1-R8 may be made available for continuous monitoring of each sensor. The rotary selector switch and readout are also adapted to display the condition of the batteries associated with the system.

It should be noted that while the system referred to herein has been shown with eight sensors and eight outputs, the circuitry is adaptable to as few as one sensor and to a multiplicity of sensors greater than eight. However, it is the Applicant's experience that provision for eight sensors will be adequate in the majority of potential applications for this apparatus.

The tilt sensor and monitoring system of the present invention has numerous advantages over the prior art as follows:

1. It provides a precision digital readout with high stability and freedom from changes due to the surrounding environment and battery drain over extended usage.
2. The components may be selected for very low power consumption, such as by using CMOS devices and low power operational amplifiers.
3. After initial calibration adjustments for gain and threshold, no further calibration or operating adjustments are normally required over a long period of time.
4. The novel A.C. amplification system reduces errors due to D.C. drift and offset.
5. The system is adaptable to remote monitoring over long distances by means of direct wired connections, fiber optic cable, or radio frequency transmission.
6. The apparatus is direct reading, readily calibrated, and does not require special skills to operate.
7. High accuracy is achieved by the use of a precision voltage reference to achieve independence from battery degradation and a bifilar-wound coupling transformer to produce precisely balanced in-phase and out-of-phase excitation voltages for the bubble level sensor element.
8. The system has the capability for continuous monitoring and continuous recording.
9. The threshold warning level may be selectable and changeable at either the tilt sensor or the control console.
10. The sensing element may be particularly adapted to a wide variety of angular measurement ranges and provided with selected damping characteristics to supply filtering of vibratory or other periodic motions.
11. The threshold detector is provided with a wide range hysteresis loop to reduce spurious triggering and false alarms.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. Apparatus for sensing angular displacement of an inanimate body from a reference axis, comprising:
   (a) a mounting plate for securing said apparatus to said body;
   (b) a sensor assembly secured to said mounting plate, said assembly including:

means for providing a pulsed audio-frequency excitation signal of predetermined amplitude,
an electrolytic bubble level sensor,
means for differentially exciting said electrolytic bubble level sensor with said signal, thereby to provide a pulsed output signal whose magnitude and polarity depend on the inclination of said level sensor from a reference axis, said pulsed output signal having a null value when said level sensor is aligned with said reference axis,
demodulator means responsive to said pulsed excitation signal and to said pulsed output signal for converting said pulsed output signal to a bidirectional direct current output signal,
means for providing a control signal corresponding to a predetermined angular displacement of said level sensor from said reference axis,
means for comparing said control signal with said bidirectional output signal, thereby to provide an indicator signal when said predetermined angular displacement is exceeded;
(c) control means for providing sensor control signals;
(d) means for remotely coupling said sensor assembly to said control means and for receiving signals representative of said inclination, said signals comprised of said bidirectional direct current output signal and said indicator signal;
(e) numerical readout means, responsive to said bidirectional output signal;
(f) indicator means, responsive to said indicator signal, for registering a condition wherein said angular displacement exceeds said predetermined value;
(g) alarm means, responsive to said indicator means, for signalling the presence of said condition; and
(h) means for providing said bidirectional output signal to a recorder.

2. The apparatus as set forth in claim 1, wherein said reference axis comprises a vertical axis.

3. Apparatus for sensing and displaying angular displacement of an inanimate body comprising:
sensor assembly means responsive to the influence of terrestrial gravitational force, comprising a plurality of electrical contacts immersed in an electrolytic fluid for providing a variable resistance representing the angle and direction of inclination of said means,
voltage regulator means for providing a stabilized source of electrical energy,
means for providing a first pulsed audio-frequency signal of predetermined peak amplitude from said voltage regulator means for exciting said sensor assembly means;
means coupled to said sensor assembly means for deriving a second pulsed signal indicative of an inclination from a reference axis of said sensor assembly means, and
synchronous demodulator means, responsive to said first and second pulsed signals, for converting said second pulsed signal to an equivalent bidirectional current and providing a variable direct current signal to said display means proportional in polarity and amplitude to the inclination of said sensor assembly means from said reference axis.

4. The apparatus as set forth in claim 3, further comprising threshold detector means coupled to receive said direct current signal for providing a signal output when said inclination exceeds a predetermined angular deviation from said reference axis.

5. The apparatus as set forth in claim 4, wherein said sensor assembly means comprises first voltage divider means for establishing said predetermined angular displacement.

6. The apparatus as set forth in claim 5, wherein said control means comprises second voltage divider means for establishing said predetermined angular deviation.

7. The apparatus as set forth in claim 6 wherein, said threshold detector means further comprises:
means for supplying a reference potential from said voltage regulator means to said first and second voltage dividers,
means for varying at least one of said dividers to provide a calibration voltage corresponding to said predetermined angular deviation,
means for comparing said calibration voltage and said variable direct current signal, and
means for providing an alarm energizing signal when the difference between said direct current signal and said calibration voltage exceeds a predetermined value.

8. The apparatus as set forth in claim 7, further comprising:
threshold indicator means, responsive to said alarm signal, for registering the presence of a condition wherein said direct current signal exceeds said predetermined value, and
alarm means, responsive to said energizing signal, for providing a warning indication when said predetermined angular deviation is exceeded.

9. The apparatus as set forth in claim 8, wherein said variable direct current signal is coupled to energize a graphical recorder.

10. The apparatus as set forth in claim 7, wherein said threshold detector means includes hysteresis loop means, responsive to positive and negative input signals, coupled to receive said alarm energizing signal and said reference potential and to provide an output signal corresponding to an algebraic difference thereof to an input of said detector means, for delaying the response of said detector means until the difference of said calibration voltage and said variable direct current signal exceeds said predetermined value.

11. A circuit for the hysteresis loop means as set forth in claim 10, comprising:
a differential amplifier having first and second voltage inputs and providing a voltage output responsive thereto,
means for exciting said first input by said reference potential,
means for exciting said second input by said alarm energizing signal,
means for forming an algebraic sum of said differential amplifier voltage output and said calibration voltage for providing said alarm energizing signal to said alarm means, and unitary feedback means coupled to receive a voltage corresponding to said algebraic sum and to provide a portion thereof corresponding to said alarm energizing signal to said second input,
said differential amplifier providing an output signal enhancing said calibration voltage when excited by a value of said alarm energizing signal less than said reference potential, and providing an output signal opposing said calibration voltage when excited by a value of said alarm energizing signal greater than said reference potential.

12. The circuit as set forth in claim 11, further comprising a resistor coupled to receive said voltage output responsive to said first and second voltage inputs and for applying at least a portion thereof to said comparator means.

13. The apparatus as set forth in claim 4, further comprising digital display means, responsive to said demodulator means, for providing a numerical readout representative of said inclination.

14. The apparatus as set forth in claim 13, further comprising threshold detector means coupled to receive said variable direct current signal and a source of reference potential for providing a signal output when said inclination exceeds a predetermined angular deviation from said reference axis, and control means, coupled to said display means and said signal output of said threshold detector means, coupled to receive energy from a power source and to distribute at least a portion thereof to said sensor assembly means, said display means, and to said threshold detector means.

15. The apparatus as set forth in claim 14, further comprising power supply means for energizing said control means.

16. The apparatus as set forth in claim 14, further comprising remote coupling means for coupling said sensor assembly means to said display means.

17. The apparatus as set forth in claim 16, said coupling means further comprising at least one pair of electrical conductors.

18. The apparatus as set forth in claim 14, further comprising a plurality of sensor assembly means coupled to provide signals representative of the individual angular inclinations thereof to said control means.

19. The apparatus as set forth in claim 18, further comprising switch means for selecting said inclination signals for at least one of said plurality of sensor assembly means and for coupling said at least one signal to said display means.

20. The apparatus as set forth in claim 3, wherein said reference axis comprises a vertical axis.

* * * * *